Patented May 2, 1950

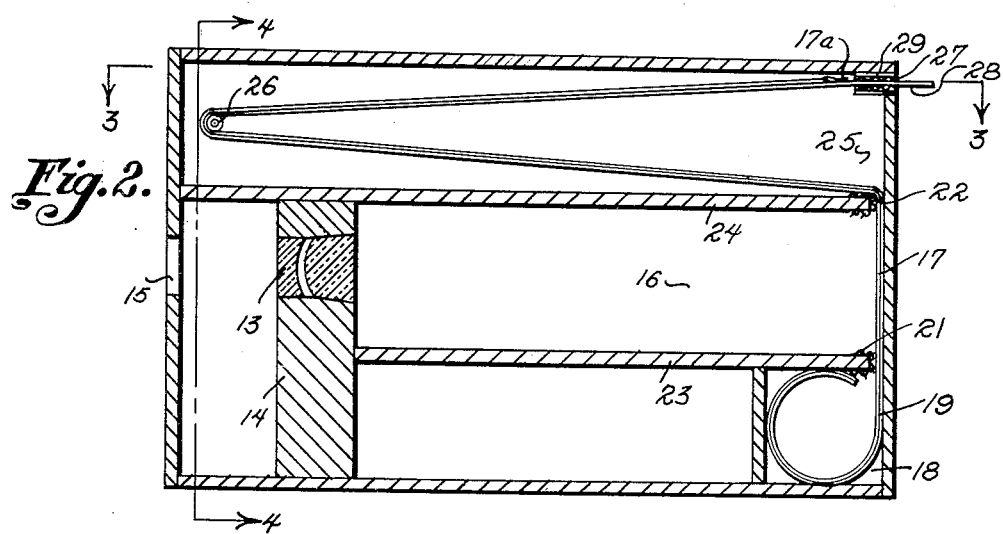
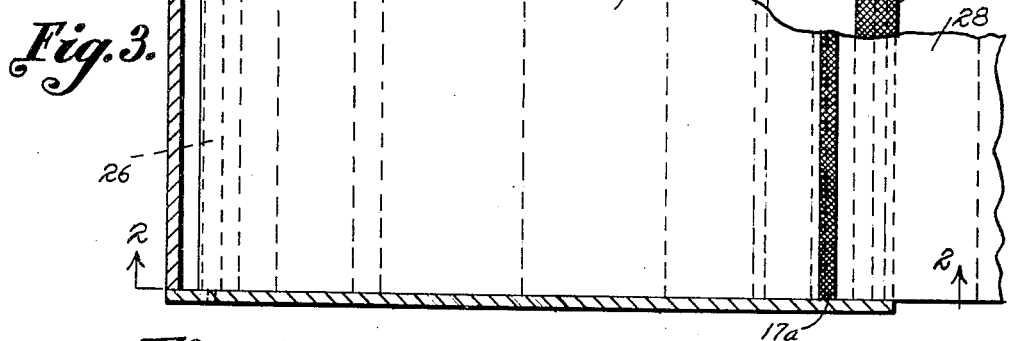
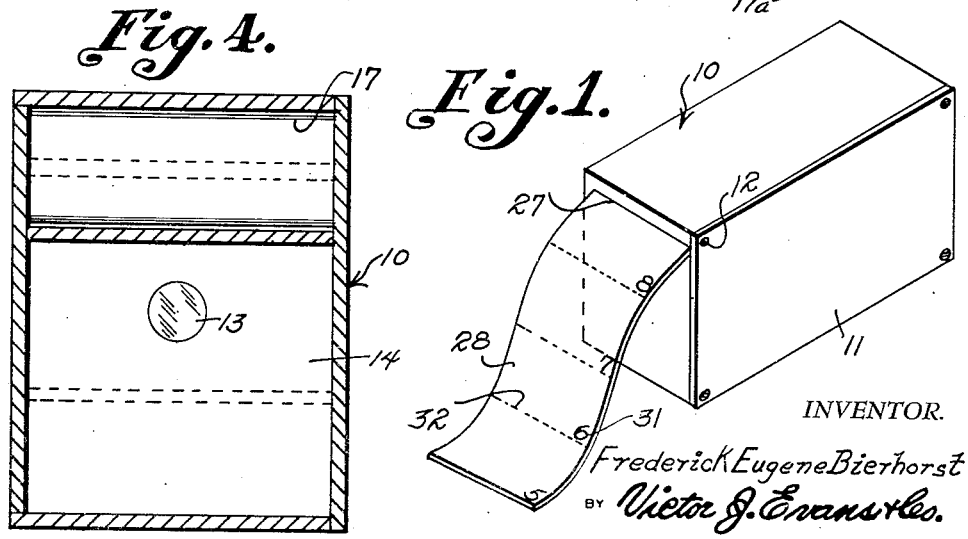

2,506,484

UNITED STATES PATENT OFFICE 2,506,484

CAMERA WITH DARKROOM LOADED ROLL FILM

Frederick Eugene Bierhorst, New Orleans, La.

Application August 7, 1947, Serial No. 766,932

1 Claim. (Cl. 95—31)

This invention relates to cameras.

It is the object of the present invention to provide a camera which is to be loaded and unloaded in a dark room and which eliminates spools, winding keys and other expensive devices.

Other objects of this invention are to provide a camera which is of simple construction, inexpensive to manufacture and easy to operate, and which can be sold fully loaded with film.

For other objects and for a better understanding of the invention, reference may be had to the following detailed description taken in connection with the accompanying drawing, in which Fig. 1 is a perspective view of my camera with a portion of the protective paper backing pulled from the same.

Fig. 2 is a cross-sectional view, in elevation, taken on line 2—2 of Fig. 3.

Fig. 3 is a cross-sectional view, the top portion being removed and the view taken on line 3—3 of Fig. 2.

Fig. 4 is a transverse cross-sectional view, in elevation, taken on line 4—4 of Fig. 2.

Referring now to the figures, 10 represents my camera box having a removable side 11 which is secured to the main body of the box by screws 12 at each corner of the side. At the forward end of the camera and within the same is a lens system 13. A thick support 14 is provided for the lens. The lens is aligned with an opening 15 in the front of the camera which can be controlled by any well known shutter device. Light will pass rearwardly from the lens through space 16 to expose a film 17 which is drawn upwardly along the rear end of the camera from a storage space 18. Within the space 18 the film is in roll form as indicated at 19 and it may or may not have the usual protective paper backing. The camera is adapted to be loaded within a dark room and then sealed. After the pictures have been taken the camera must be unloaded in a dark room. Since the film does not leave the camera except when the camera is in a dark room it can be made as stated with or without a protective paper backing. The film 17 is retained against the rear end of the camera by felt light trap formations 21 and 22 provided upon partitions 23 and 24 respectively.

Above the partition 24 is a long space 25 into which film 17 is extended upon passing light trap 22. A roll 26 is provided at the forward end of the space 25 over which the film is extended and returned to the rear end of the space to pass to a slot 27 in the rear of the camera. The protective backing of the film is indicated at 28 and is pulled through the slot 27 leaving the film portion within the space 25. The backing 28 is approximately twice the length of the film 17 so that when the end of the film is reached as in Figure 2 the protective backing extending beyond the end of the film has been moved outwardly of the camera through the slot 27. The protective backing constitutes a leader for the film, and to permit the forward end of the film to be removed from the backing the backing is detachably connected to the film by means of a strip of adhesive 17a. Felt or light trap means 29 are provided in the slot 27. The film is advanced by pulling the backing through the slot. This backing has number indications 31 thereon with adjacent perforations 32 which are aligned with the slots each time the film is advanced to take a new picture. The portions between the perforations are torn as the backing is advanced or pulled from the slots 27. In other words, the lead or backing of the film is marked to show the correct spacing of exposures to avoid the possibility of a double exposure and serves as a vehicle for moving the film from one position to the next position. By increasing the number of rollers 26 within the space 25, the number of exposures can be increased.

While various changes may be made in the detail construction, it shall be understood that such changes shall be within the spirit and scope of the present invention as defined by the appended claim.

I claim:

A camera comprising a casing having an elongated exposure chamber provided with a lens on the forward end thereof, an elongated storage chamber located at one side of the exposure chamber and a film chamber adapted to contain a rolled one-piece strip of film, the exposure chamber being provided at the rear end thereof with openings registering with the storage and film chambers, and through which the film may be fed from the latter into the former, the casing having a slot in its rear wall registering with the storage chamber, a guide within the storage chamber near the front of the chamber, a leader extending from the film through said openings into the storage chamber, the leader extending forwardly of the storage chamber to and about the guide and thence rearwardly of the storage chamber to and through said slot, the leader being adapted to be successively operated to expose the respective portions of the film and to move the exposed film into and fold it within the storage chamber and said openings and said slot being provided with light traps to prevent the passage of light into said casing during the movement of the film and the leader through said chambers.

FREDERICK EUGENE BIERHORST.

REFERENCES CITED

The following references are of record in the file of this patent:

UNITED STATES PATENTS

| Number | Name | Date |
|---|---|---|
| 471,584 | Whitney | Mar. 29, 1892 |
| 471,585 | Whitney | Mar. 29, 1892 |
| 729,325 | Goodwin | May 26, 1903 |
| 1,245,760 | Moxon | Nov. 6, 1917 |
| 1,857,524 | Wood | May 10, 1932 |

FOREIGN PATENTS

| Number | Country | Date |
|---|---|---|
| 265,218 | Great Britain | July 14, 1927 |
| 782,157 | France | Mar. 11, 1935 |